Figure 1:
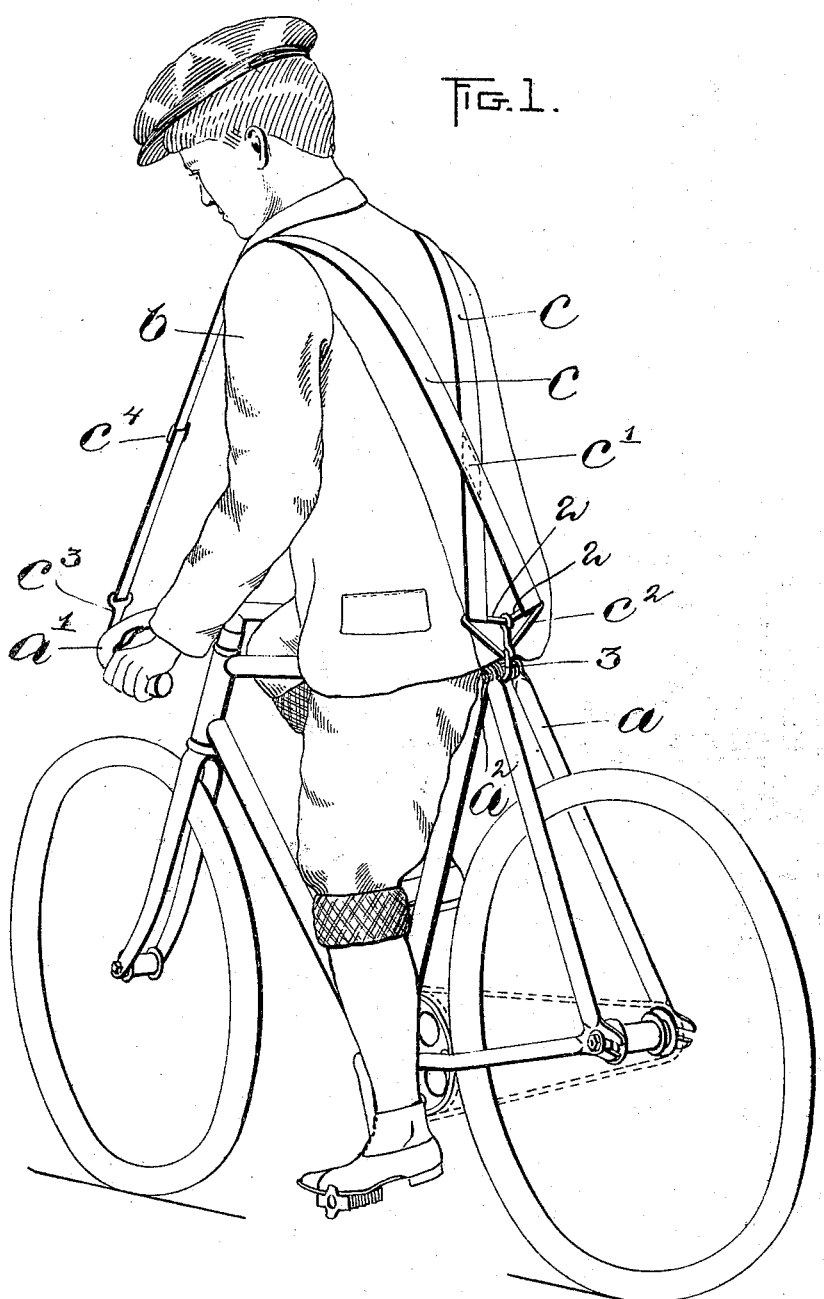

No. 638,861. Patented Dec. 12, 1899.
J. C. BEAN.
BICYCLE HARNESS.
(Application filed Jan. 26, 1899.)

(No Model.) 2 Sheets—Sheet 1

WITNESSES:
A. D. Harrison
P. W. Pezzetti

INVENTOR:
John C. Bean
by Wright, Brown & Quinby
Attys.

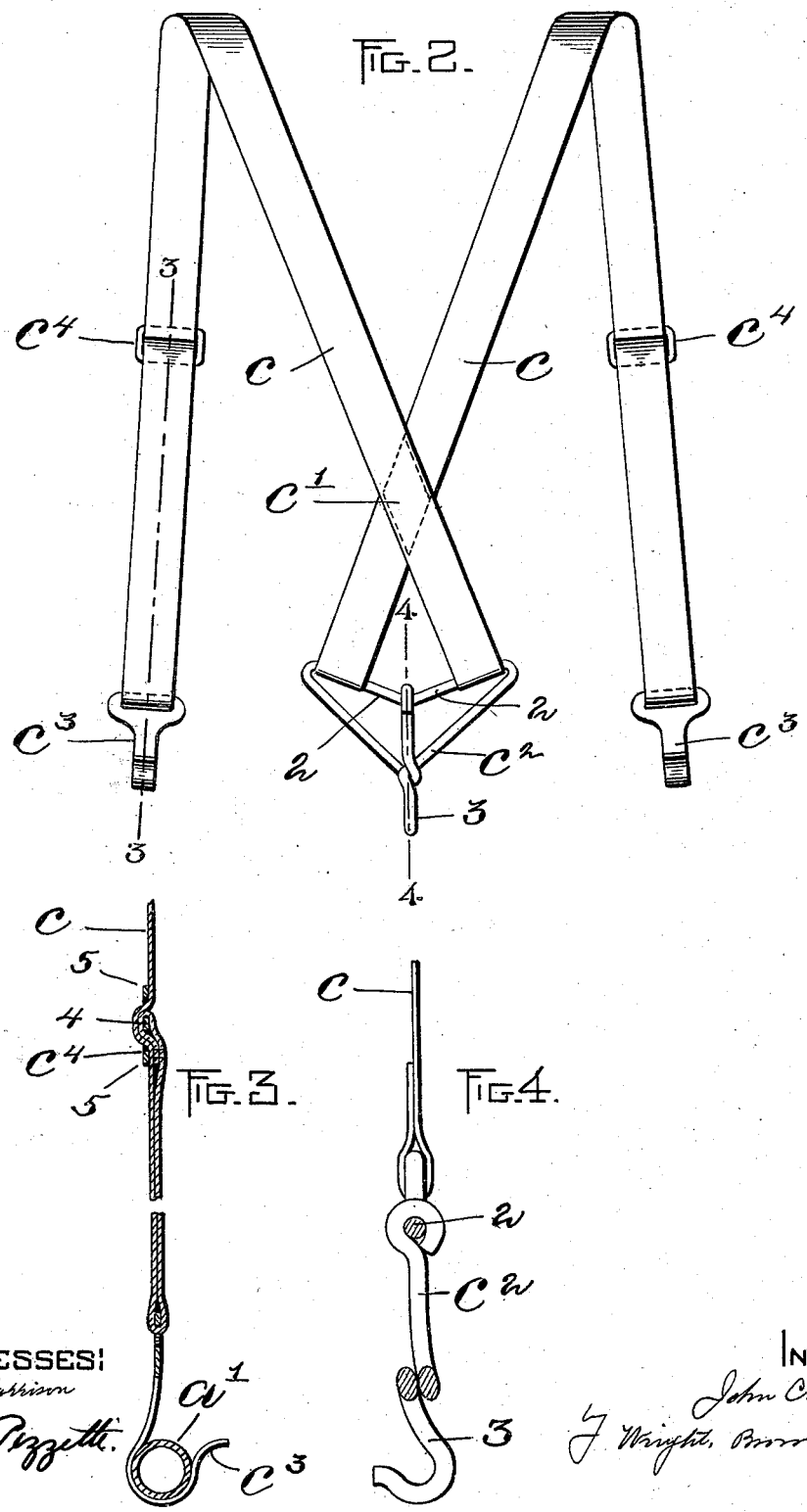

UNITED STATES PATENT OFFICE.

JOHN C. BEAN, OF LEXINGTON, MASSACHUSETTS, ASSIGNOR TO CHARLES M. MARTIN, OF BOSTON, MASSACHUSETTS.

BICYCLE-HARNESS.

SPECIFICATION forming part of Letters Patent No. 638,861, dated December 12, 1899.

Application filed January 26, 1899. Serial No. 703,460. (No model.)

*To all whom it may concern:*

Be it known that I, JOHN C. BEAN, of Lexington, in the county of Middlesex and State of Massachusetts, have invented certain new and useful Improvements in Bicycle-Harness, of which the following is a specification.

This invention has relation to braces or attachments for bicycles and similar vehicles to assist the rider in exerting his full power on the pedals.

The invention has for its object to provide an article of this character which shall be simple and inexpensive in construction and shall permit the rider to readily shift his position with respect to the brace.

The invention consists in the novel features of construction and arrangement which I shall now proceed to describe and claim.

Of the accompanying drawings, forming a part of this specification, Figure 1 represents a perspective view of a bicycle and rider, showing the construction and application of a brace embodying my invention. Fig. 2 represents a rear elevation of the brace. Fig. 3 represents a section on the line 3 3 of Fig. 2. Fig. 4 represents a section on the line 4 4 of Fig. 2.

The same reference characters indicate the same parts in all the figures.

Referring to the drawings, $a$ designates the bicycle, $b$ the rider, and $c\ c$ a brace embodying my invention. The brace, as here shown, comprises two flat straps or bands composed of a suitable material, such as strong webbing, the said bands being crossed at $c'$ near their rear ends and secured together by stitching. The straps $c\ c$, as clearly shown in Fig. 1, are attached to the bicycle at their front and rear ends and pass up over both shoulders of the rider. At the rear end of the brace any convenient point of attachment may be selected at or near the seat, such as the seat-post, the seat or saddle itself, or the clamping-bolt for securing the seat-post in the middle frame-tube. The drawings illustrate an attaching device $c^2$, bent up out of strong wire and having top transverse bars or portions 2 2, to which the rear ends of the straps $c\ c$ are secured, and a central hook or clip 3, adapted to take under the clamping-bolt $a^2$, which clamps the saddle-post to the bicycle-frame. In this way the rear end of the brace may be quickly and easily attached to the bicycle-frame and as readily detached therefrom; but I wish it to be understood that any other suitable attaching device may, without departing from the spirit of my invention, be employed for attaching the said rear end of the brace to a point or points at or near the seat.

At their front ends the straps $c\ c$ are shown as provided with spring clips or hooks $c^3\ c^3$, adapted to take under the handle-bar $a'$ of the bicycle, on either side of the middle of said bar, and on the straps, near their front ends, in a position to be conveniently reached by the rider, are mounted adjusting-buckles $c^4\ c^4$ for varying the length of the straps. The buckles here shown are slip-buckles of a well-known pattern, comprising three cross-bars 4 5 5, Fig. 3, joined across their ends, the end of the looped strap being attached to the middle bar 4 of the buckle and the main portion of said strap passing in front of said end part and through the slots between the bars 5 5.

The operation of my improved brace will be readily perceived from the illustration in Fig. 1. Its attachment to the bicycle in the manner indicated permits the rider to obtain the most advantageous position for the exertion of his full power, for by shifting the position of his shoulders backward or forward beneath the brace and pushing upwardly against the latter he can obtain an abutment or point of resistance more or less directly above the pedals, which enables him greatly to augment the power of his thrust upon the pedals. He is enabled in addition to shift his body back toward the upright and obtain a rest or support therefor when he does not desire to exert full pressure on the pedals, the buckles $c^4$ being shifted to lengthen the straps for this movement, if necessary. The brace by its construction and manner of attachment also distributes the strain or pressure more evenly on the bicycle than certain braces or staying devices heretofore known, in which it has been proposed to attach the brace at only one place or at a weak place on the bicycle.

A feature of advantage of the brace is that it can be instantly detached from the handle-bar in case of a hasty dismount by the rider. The hooks $c^3$ can be reached and removed from the bar while the rider still controls the wheel with his hands on the bar. The device is thus perfectly safe in use. It is also an aid in steering, inasmuch as the rider can use his shoulders in moving the steering-wheel, there being independent connections from the two shoulders to the handle-bar on opposite sides of the steering-post.

I claim—

1. A device of the character specified, comprising two straps or bands having provisions at their rear ends for attachment to a bicycle or similar vehicle at or near the seat, and constructed and arranged to pass over the shoulders of the rider, said straps being separated at their front ends and each having thereat an attaching device, whereby the front ends of said straps may be attached independently to the handle-bar on opposite sides of the steering-post, substantially as described.

2. A device of the character specified, comprising the two straps or bands $c$ $c$ connected at or near their rear ends, and having an attaching device secured to their rear ends and adapted for attachment to a bicycle or similar vehicle at or near the seat, said straps being separated at their front ends and provided with the adjusting-buckles $c^4$ $c^4$ and with the hooks $c^3$ $c^3$ at said front ends, whereby said front ends may be detachably secured to the handle on opposite sides of the steering-post, substantially as described.

In testimony whereof I have affixed my signature in presence of two witnesses.

JOHN C. BEAN.

Witnesses:
  MARCUS B. MAY,
  R. M. PIERSON.